US007264888B2

(12) United States Patent
Darolia et al.

(10) Patent No.: US 7,264,888 B2
(45) Date of Patent: Sep. 4, 2007

(54) COATING SYSTEMS CONTAINING GAMMA-PRIME NICKEL ALUMINIDE COATING

(75) Inventors: Ramgopal Darolia, West Chester, OH (US); Joseph David Rigney, Milford, OH (US); William Scott Walston, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/904,220

(22) Filed: Oct. 29, 2004

(65) Prior Publication Data

US 2006/0093850 A1 May 4, 2006

(51) Int. Cl.
*B32B 15/00* (2006.01)
*B63H 1/26* (2006.01)

(52) U.S. Cl. ...................... 428/680; 428/670; 428/678; 428/679; 428/469; 428/472; 428/632; 428/633; 416/241 R

(58) Field of Classification Search ................. 428/680
See application file for complete search history.

(56) References Cited

U.S. PATENT DOCUMENTS

| | | | | |
|---|---|---|---|---|
| 4,447,503 | A | 5/1984 | Dardi et al. | |
| 4,719,080 | A | 1/1988 | Duhl et al. | |
| 4,758,480 | A | 7/1988 | Hecht et al. | |
| 6,066,405 | A | 5/2000 | Schaeffer | |
| 6,585,878 | B2 * | 7/2003 | Strangman et al. | 205/264 |
| 6,924,045 | B2 * | 8/2005 | Khan et al. | 428/678 |
| 2005/0003227 | A1 * | 1/2005 | Khan et al. | 428/678 |

* cited by examiner

*Primary Examiner*—Jennifer McNeil
*Assistant Examiner*—Gordon R. Baldwin
(74) *Attorney, Agent, or Firm*—David L. Narciso; Gary M. Hartman; Domenica N. S. Hartman

(57) ABSTRACT

An overlay coating for articles used in hostile thermal environments. The coating has a predominantly gamma prime-phase nickel aluminide ($Ni_3Al$) composition suitable for use as an environmental coating and as a bond coat for a thermal barrier coating. The coating has a composition of, by weight, at least 6% to about 15% aluminum, about 2% to about 5% chromium, optionally one or more reactive elements in individual or combined amounts of up to 4%, optionally up to 2% silicon, optionally up to 60% of at least one platinum group metal, and the balance essentially nickel. A thermal-insulating ceramic layer may be deposited on the coating.

20 Claims, 2 Drawing Sheets

I External NiO, Internal $Cr_2O_3/Al_2O_3/Ni(Al,Cr)_2O_4$
II External $Cr_2O_3$, Internal $Al_2O_3$
III External $Al_2O_3$

COATING SYSTEMS CONTAINING GAMMA-PRIME NICKEL ALUMINIDE COATING

BACKGROUND OF THE INVENTION

This invention relates to coatings of the type used to protect components exposed to high temperature environments, such as the hostile thermal environment of a gas turbine engine. More particularly, this invention is directed to a predominantly gamma-prime (Y') phase nickel aluminide overlay coating that is alloyed to exhibit enhanced environmental properties, and as a result is useful as an environmental coating and as a bond coat for a thermal insulating ceramic layer.

Certain components of the turbine, combustor and augmentor sections that are susceptible to damage by oxidation and hot corrosion attack are typically protected by an environmental coating and optionally a thermal barrier coating (TBC), in which case the environmental coating is termed a bond coat that in combination with the TBC forms what may be termed a TBC system. Environmental coatings and TBC bond coats are often formed of an oxidation-resistant aluminum-containing alloy or intermetallic whose aluminum content provides for the slow growth of a strong adherent continuous aluminum oxide layer (alumina scale) at elevated temperatures. This thermally grown oxide (TGO) provides protection from oxidation and hot corrosion, and in the case of a bond coat promotes a chemical bond with the TBC. However, a thermal expansion mismatch exists between metallic bond coats, their alumina scale and the overlying ceramic TBC, and peeling stresses generated by this mismatch gradually increase over time to the point where TBC spallation can occur as a result of cracks that form at the interface between the bond coat and alumina scale or the interface between the alumina scale and TBC. More particularly, coating system performance and life have been determined to be dependent on factors that include stresses arising from the growth of the TGO on the bond coat, stresses due to the thermal expansion mismatch between the ceramic TBC and the metallic bond coat, the fracture resistance of the TGO interface (affected by segregation of impurities, roughness, oxide type and others), and time-dependent and time-independent plastic deformation of the bond coat that leads to rumpling of the bond coat/TGO interface. Therefore, advancements in TBC coating system are concerned with delaying the first instance of oxide spallation affected by the above factors.

Environmental coatings and TBC bond coats in wide use include alloys such as MCrAlX overlay coatings (where M is iron, cobalt and/or nickel, and X is yttrium or another rare earth element), and diffusion coatings that contain aluminum intermetallics, predominantly beta-phase nickel aluminide (β-NiAl) and platinum aluminides (PtAl). Because TBC life depends not only on the environmental resistance but also the strength of its bond coat, bond coats capable of exhibiting higher strength have also been developed, a notable example of which is beta-phase NiAl overlay coatings. In contrast to the aforementioned MCrAlX overlay coatings, which are metallic solid solutions containing intermetallic phases, the NiAl beta phase is an intermetallic compound that exists for nickel-aluminum compositions containing about 35 to about 60 atomic percent aluminum. Examples of beta-phase NiAl overlay coatings are disclosed in commonly-assigned U.S. Pat. Nos. 5,975,852 to Nagaraj et al., 6,153,313 to Rigney et al., 6,255,001 to Darolia, 6,291,084 to Darolia et al., and 6,620,524 to Pfaendtner et al. These NiAl compositions, which preferably contain a reactive element (such as zirconium and/or hafnium) and/or other alloying constituents (such as chromium), have been shown to improve the adhesion of a ceramic TBC, thereby increasing the spallation resistance of the TBC. The presence of reactive elements such as zirconium and hafnium in these beta-phase NiAl overlay coatings has been shown to improve environmental resistance as well as strengthen the coating, primarily by solid solution strengthening. However, beyond the solubility limits of the reactive elements, precipitates of a Heusler phase ($Ni_2AlZr$ (Hf, Ti, Ta)) can occur that can drastically lower the oxidation resistance of the coating.

The suitability of environmental coatings and TBC bond coats formed of NiAlPt to contain the gamma phase (y-Ni) and gamma-prime phase (y'$Ni_3Al$) has also been considered. For example, in work performed by Gleeson et al. at Iowa State University, Ni-22Al-30Pt compositions (by atomic percent; about Ni-6.4Al-63.5Pt by weight percent) were evaluated, with the conclusion that the addition of platinum to gamma+gamma prime coating alloys is beneficial to their oxidation resistance. It was further concluded that, because nickel-base superalloys typically have a gamma+gamma prime microstructure, there are benefits to coatings that also contain the gamma+gamma prime structure. Finally, Pt-containing gamma+gamma prime coatings modified to further contain reactive elements were also contemplated.

TBC systems and environmental coatings are being used in an increasing number of turbine applications (e.g., combustors, augmentors, turbine blades, turbine vanes, etc.). Notable substrate materials include directionally-solidified (DS) alloys such as René 142 and single-crystal (SX) alloys such as René N5. The spallation resistance of a TBC is complicated in part by the composition of the underlying superalloy and interdiffusion that occurs between the superalloy and the bond coat. For example, the above-noted bond coat materials contain relatively high amounts of aluminum relative to the superalloys they protect, while superalloys contain various elements that are not present or are present in relatively small amounts in these coatings. During bond coat deposition, a primary diffusion zone of chemical mixing occurs to some degree between the coating and the superalloy substrate as a result of the concentration gradients of the constituents. For many nickel-base superalloys, it is typical to see a primary diffusion zone of topologically close-packed (TCP) phases in the gamma matrix phase of the superalloy after high temperature exposures. The incidence of a moderate amount of TCP phases beneath the coating is typically not detrimental. At elevated temperatures, further interdiffusion occurs as a result of solid-state diffusion across the substrate/coating interface. This additional migration of elements across the substrate-coating interface can sufficiently alter the chemical composition and microstructure of both the bond coat and the substrate in the vicinity of the interface to have deleterious results. For example, migration of aluminum out of the bond coat reduces its oxidation resistance, while the accumulation of aluminum in the substrate beneath the bond coat can result in the formation of a deleterious secondary reaction zone (SRZ) beneath the primary diffusion zone. Certain high strength nickel-base superalloys that contain significant amounts of refractory elements, such as tungsten, tantalum, molybdenum, chromium, and particularly rhenium are prone to the formation of SRZ containing y phase and deleterious TCP phases (typically containing rhenium, tungsten and/or tantalum) in a gamma-prime matrix phase (hence, characterized by a gamma/gamma-prime inversion). Because the boundary between SRZ constituents and the original substrate is a high angle boundary that doesn't tolerate deformation, SRZ and its boundaries readily crack under stress, drastically reducing the load-carrying capability of the alloy. Notable examples of superalloys prone to deleterious SRZ formation include fourth generation single-crystal nickel-base superalloys disclosed in commonly-assigned U.S. Pat. Nos. 5,455,120 and 5,482,789, commercially known as René N6 and MX4, respectively. There have been ongoing efforts to develop coating systems that substantially reduce or eliminate the formation of SRZ in high-refractory alloys coated with diffusion aluminide and overlay coatings.

In view of the above, there remains a considerable and continuous effort to further increase the service life of environmental coatings and TBC systems, while also mitigating any adverse affects they may have on the substrates they protect.

BRIEF SUMMARY OF THE INVENTION

The present invention generally provides a protective overlay coating for articles used in hostile thermal environments, such as turbine, combustor and augmentor components of a gas turbine engine. The invention is particularly directed to a predominantly gamma prime-phase nickel aluminide ($Ni_3Al$) overlay coating suitable for use as an environmental coating and as a bond coat for a thermal barrier coating (TBC). The gamma prime-phase nickel aluminide employed in the present invention is one of two stable intermetallic compounds of nickel and aluminum. The gamma prime-phase exists for NiAl compositions containing nickel and aluminum in an atomic ratio of about 3:1, while beta-phase nickel aluminide (NiAl) exists for NiAl compositions containing nickel and aluminum in an atomic ratio of about 1:1. Gamma prime-phase nickel aluminide has a nominal composition of, by weight, about 86.7% nickel and about 13.3% aluminum, in contrast to the beta phase with a nominal composition of, by weight, about 68.5% nickel and about 31.5% aluminum. Accordingly, the gamma prime-phase nickel aluminide overlay coatings of this invention are compositionally distinguishable from beta-phase NiAl overlay coatings, as well as diffusion aluminide coatings that are predominantly beta-phase NiAl.

According to a preferred aspect of the invention, the overlay coating is used in a coating system deposited on a superalloy substrate. The overlay coating contains nickel aluminide intermetallic predominantly of the gamma prime phase, with an intentional addition of chromium. The overlay coating preferably has a composition of, by weight, at least 6% to about 15% aluminum, about 2% to about 5% chromium, optionally one or more reactive elements in individual or combined amounts of up to 4%, optionally up to 2% silicon, optionally up to 60% of at least one platinum group metal, and the balance essentially nickel. A thermal-insulating ceramic layer may be deposited on the overlay coating so as to be adhered to the substrate with the overlay coating.

The gamma prime-phase nickel aluminide intermetallic overlay coating of this invention is believed to have a number of advantages over existing overlay and diffusion coatings used as environmental coatings and bond coats for TBC. The gamma-prime phase ($Ni_3Al$) is intrinsically stronger than the beta phase (NiAl), enabling the overlay coatings of this invention to better inhibit spallation events brought on by stress-related factors. The presence of chromium in the gamma-prime phase is believed to promote the formation of an alumina scale on the relatively low-aluminum coating composition. Additional benefits are believed to be possible as a result of the higher solubility of reactive elements in the gamma-prime phase, such that much greater additions of these elements can be incorporated into the overlay coating to further improve the environmental resistance and strength of the coating. The composition of the overlay coating is also more chemically similar to superalloy compositions on which the overlay coating may be deposited, especially in terms of aluminum content. As a result, there is a reduced tendency for aluminum (and other coating constituents) to diffuse from the overlay coating into the substrate, thereby reducing the likelihood that a deleterious SRZ will form in the superalloy. Benefits are also potentially possible in view of the gamma-prime phase being generally more ductile and more processable than beta-phase compositions.

Other objects and advantages of this invention will be better appreciated from the following detailed description.

DETAILED DESCRIPTION OF THE INVENTION

Figure 1:
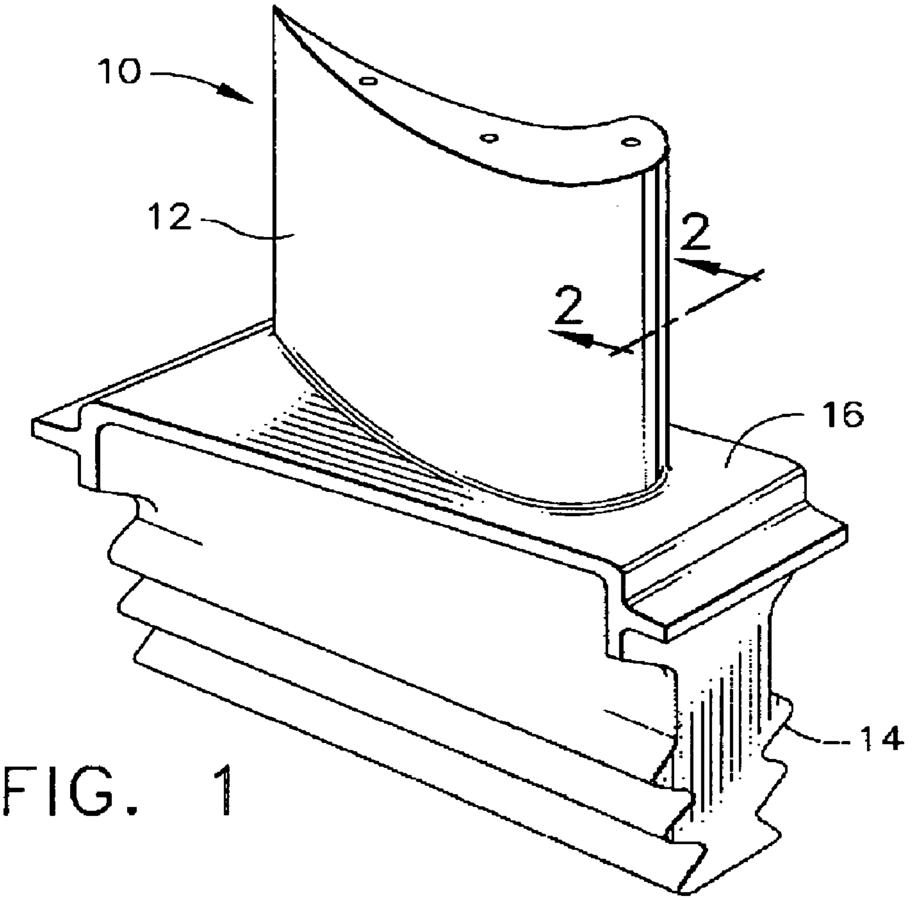
FIG. 1 is a perspective view of a high pressure turbine blade.

The present invention is generally applicable to components that operate within environments characterized by relatively high temperatures, and are therefore subjected to severe thermal stresses and thermal cycling. Notable examples of such components include the high and low pressure turbine nozzles and blades, shrouds, combustor liners and augmentor hardware of gas turbine engines. One such example is the high pressure turbine blade 10 shown in FIG. 1. The blade 10 generally includes an airfoil 12 against which hot combustion gases are directed during operation of the gas turbine engine, and whose surface is therefore subjected to severe attack by oxidation, corrosion and erosion. The airfoil 12 is anchored to a turbine disk (not shown) with a dovetail 14 formed on a root section 16 of the blade 10. While the advantages of this invention will be described with reference to the high pressure turbine blade 10 shown in FIG. 1, the teachings of this invention are generally applicable to any component on which a coating system may be used to protect the component from its environment.

Figure 2:
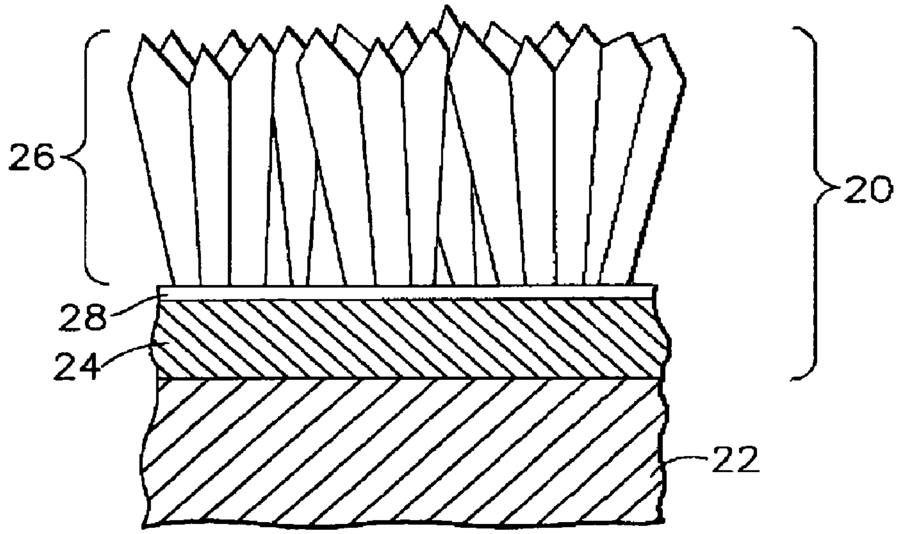
FIG. 2 is a cross-sectional view of the blade of FIG. 1 along line 2-2, and shows a thermal barrier coating system on the blade in accordance with an embodiment of this invention.

Represented in FIG. 2 is a TBC system 20 of a type that benefits from the teachings of this invention. As shown, the coating system 20 includes a ceramic layer (TBC) 26 bonded to the blade substrate 22 with an overlay coating 24, which therefore serves as a bond coat to the TBC 26. The substrate 22 (blade 10) is a nickel-base superalloy.

To attain the strain-tolerant columnar grain structure depicted in FIG. 2, the TBC 26 is preferably deposited by physical vapor deposition (PVD), though other deposition techniques could be used including thermal spray processes. A preferred material for the TBC 26 is an yttria-stabilized zirconia (YSZ), with a suitable composition being about 3 to about 20 weight percent yttria (3-20% YSZ), though other ceramic materials could be used, such as yttria, nonstabilized zirconia, and zirconia stabilized by other oxides. Notable alternative materials for the TBC 26 include those formulated to have lower coefficients of thermal conductivity (low-k) than 7% YSZ, notable examples of which are disclosed in commonly-assigned U.S. Pat. No. 6,586,115 to Rigney et al., U.S. Pat. No. 6,686,060 to Bruce et al., commonly-assigned U.S. patent application Ser. Nos. 10/063,962 to Bruce, 10/064,785 to Darolia et al., and Ser. No. 10/064,939 to Bruce et al., and U.S. Pat. No. 6,025,078 to Rickerby. Still other suitable ceramic materials for the TBC 26 include those that resist spallation from contamination by compounds such as CMAS (a eutectic of calcia, magnesia, alumina and silica). For example, the TBC can be formed of a material capable of interacting with molten CMAS to form a compound with a melting temperature that is significantly higher than CMAS, so that the reaction product of CMAS and the material does not melt and infiltrate the TBC. Examples of CMAS-resistant coatings include alumina, alumina-containing YSZ, and hafnia-based ceramics disclosed in commonly-assigned U.S. Pat. Nos. 5,660,885, 5,683,825, 5,871,820, 5,914,189, and 6,627,323 and commonly-assigned U.S. patent application Ser. Nos. 10/064,939 and 10/073,564, whose disclosures regarding CMAS-resistant coating materials are incorporated herein by reference. Other potential ceramic materials for the TBC include those formulated to have erosion and/or impact resistance better than 7% YSZ. Examples of such materials include certain of the above-noted CMAS-resistant materials, particularly alumina as reported in U.S. Pat. No. 5,683,825 and U.S. patent application Ser. No. 10/073,564. Other erosion and impact-resistant compositions include reduced-porosity YSZ as disclosed in commonly-assigned U.S. patent application Ser. Nos. 10/707,197 and 10/708,020, fully stabilized zirconia (e.g., more than 17% YSZ) as disclosed in commonly-assigned U.S. patent application Ser. No. 10/708,020, and chemically-modified zirconia-based ceramics. The TBC 26 is deposited to a thickness that is sufficient to provide the required thermal protection for the underlying substrate 22 and blade 10, generally on the order of about 100 to about 300 micrometers.

As with prior art TBC systems, the surface of the overlay coating 24 has a composition that when exposed to an oxidizing environment forms an aluminum oxide surface layer (alumina scale) 28 to which the TBC 26 chemically bonds. According to the invention, the overlay coating 24 is predominantly of gamma-prime phase nickel aluminide ($Ni_3Al$), preferably with limited alloying additions. Depending on its composition, the overlay coating 24 can be deposited using a single deposition process or a combination of processes. An adequate thickness for the overlay coating 24 is about fifty micrometers in order to protect the underlying substrate 22 and provide an adequate supply of aluminum for formation of the alumina scale 28, though thicknesses of about twelve to about one hundred micrometers are believed to be suitable.

To be predominantly of the gamma-prime intermetallic phase, the overlay coating 24 of this invention preferably contains nickel and aluminum in an atomic ratio of about 3 to 1, which on a weight basis is about 86.7 to 13.3. An aluminum content upper limit of about 15 weight percent is generally necessary to stay within the gamma-prime field. With further alloying additions, the aluminum content of the overlay coating 24 may be as low as about 6 weight percent, which is believed to be sufficient to form the desired alumina scale 28. A preferred aluminum content is in the range of about 8.5 to about 15 weight percent.

Figure 3:
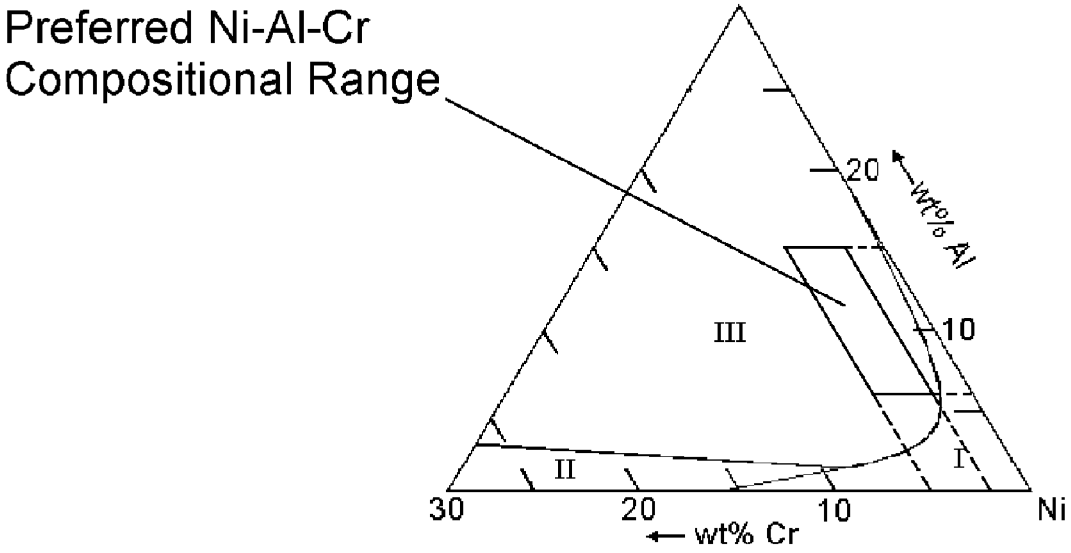
FIG. 3 is a chart indicating the suitable compositional ranges for nickel, aluminum and chromium in a gamma prime-phase nickel aluminide intermetallic overlay coating of this invention.

Chromium is a preferred alloying addition to the coating 24. Also preferred are reactive elements such as zirconium, hafnium, yttrium, tantalum, etc. Optional alloying additives include silicon and a platinum group metal, such as platinum, rhodium, palladium, and iridium. A suitable chromium content is about 2 to 5 weight percent chromium. Chromium is a preferred additive as it promotes the corrosion resistance of the overlay coating 24 as well as helps in the formation of the alumina scale 28, especially when the aluminum content of the coating 24 is near the lower end of its above-noted range. This preferred relationship between the aluminum and chromium content is depicted in FIG. 3. Chromium contents above about 5 weight percent are believed to be detrimental. For example, higher chromium contents refine the alumina grain size leading to higher oxidation rates, and promote the formation of non-protective $Cr_2O_3$ scale as opposed to the desired alumina scale 28. Higher chromium contents also risk the formation of volatile chromium trioxide ($CrO_3$), and may reduce the formability of the gamma-prime phase compositions. This aspect is important in the manufacture of ingots that would be used as a source material if depositing the coating 24 by ion plasma deposition or EBPVD using a single deposition source.

The addition of one or more reactive elements to the overlay coating 24 in a combined amount of at least 0.5 weight percent is preferred for promoting the oxidation or environmental resistance and strength of the gamma-prime phase. A combined or individual reactive element content of above about 4 weight percent is believed to be detrimental due to the solubility limits of the individual elements in the gamma-prime phase and the adverse effect that these elements have on ductility of the gamma-prime phase beyond this level.

Limited additions of silicon are believed to have a strong beneficial effect on oxidation resistance in gamma-prime phase compositions. However, silicon must be controlled to not more than about 2 weight percent to avoid excessive interdiffusion into the substrate 22.

Platinum (and other platinum group metals) are known to have a beneficial effect with conventional diffusion aluminide coatings. When added to the predominantly gamma-prime phase of the overlay coating 24 of this invention, platinum group metals have been shown to improve oxidation resistance by enhancing the ability of the coating 24 to form an adherent alumina scale. A platinum group metal content of up to about 60 weight percent is believed to be beneficial for the gamma-prime phase overlay coating 24.

On the basis of the above, the nickel content may be as high as about 90 weight percent (such as when aluminum and chromium are the only other constituents of the coating 24) to ensure that the coating 24 is predominantly of the gamma-prime phase. On the other hand, nickel contents of as low as about 20 weight percent may exist if the coating 24 contains the maximum levels of chromium, reactive element(s), silicon, and platinum group metal contemplated for the coating 24. Because of interdiffusion inherent in any process of forming the coating 24, the coating 24 will contain up to about 8 weight percent of elements such as tungsten, rhenium, tantalum, molybdenum, etc., that were not deposited with the intentional coating constituents but have diffused into the coating 24 from the substrate 22.

Arc melted buttons having compositions within the scope of this invention have been found to exhibit excellent oxidation resistance and resist rumpling as a result of being stronger than beta phase-based coatings of the prior art.

While the invention has been described in terms of a preferred embodiment, it is apparent that other forms could be adopted by one skilled in the art. Accordingly, the scope of the invention is to be limited only by the following claims.

What is claimed is:

1. A coating system on a superalloy substrate, the coating system comprising an intermetallic overlay coating overlying a surface of the substrate, the intermetallic overlay coating being predominantly of gamma-prime phase nickel aluminide, the intermetallic overlay coating having an as-deposited composition comprising, by weight, at least 6% to about 15% aluminum, about 2% to about 5% chromium, optionally up to 4% of at least one reactive element, optionally up to 2% silicon, optionally up to 60% of at least one platinum group metal, and the balance essentially nickel and incidental impurities.

2. The coating system according to claim 1, wherein the overlay coating contains nickel and aluminum in an atomic ratio of about 3:1.

3. The coating system according to claim 1, wherein the overlay coating consists of, by weight, at least 6% to about 15% aluminum, about 2% to about 5% chromium, and the balance nickel and elements present in the coating as a result of diffusion from the substrate.

4. The coating system according to claim 1, wherein the overlay coating contains, by weight, at least 0.5% to about 4% of the at least one reactive element.

5. The coating system according to claim 4, wherein the at least one reactive element is at least one of zirconium, hafnium, yttrium, and tantalum.

6. The coating system according to claim 1, wherein the overlay coating consists of, by weight, at least 6% to about 15% aluminum, about 2% to about 5% chromium, at least 0.5% to about 4% of the at least one reactive element, and the balance nickel and elements present in the coating as a result of diffusion from the substrate.

7. The coating system according to claim 6, wherein the at least one reactive element is at least one of zirconium, hafnium, yttrium, and tantalum.

8. The coating system according to claim 1, wherein the overlay coating contains the at least one platinum group metal.

9. The coating system according to claim 1, wherein the overlay coating contains silicon.

10. The coating system according to claim 1, further comprising a thermal-insulating ceramic layer adhered to the overlay coating.

11. The coating system according to claim 1, wherein the overlay coating does not contain any platinum group metal.

12. A coating system on a nickel-base superalloy substrate, the coating system comprising an overlay coating overlying a surface of the substrate, the overlay coating being predominantly of gamma-prime phase nickel aluminide, the overlay coating having an as-deposited composition consisting of, by weight, at least 6% to about 15% aluminum, about 2% to about 5% chromium, at least 0.5% to about 4% of at least one reactive element, optionally up to 2% silicon, optionally up to 60% of at least one platinum group metal, the balance nickel and incidental impurities.

13. The coating system according to claim 12, wherein the overlay coating contains nickel and aluminum in an atomic ratio of about 3:1.

14. The coating system according to claim 12, wherein the overlay coating consists of, by weight, at least 6% to about 15% aluminum, about 2% to about 5% chromium, at least 0.5% to about 4% of the at least one reactive element, and the balance nickel and elements present in the coating as a result of diffusion from the substrate.

15. The coating system according to claim 12, wherein the overlay coating contains, by weight, 8.5% to about 15% aluminum.

16. The coating system according to claim 12, wherein the at least one reactive element is at least one of zirconium, hafnium, yttrium, and tantalum.

17. The coating system according to claim 12, wherein the overlay coating contains the at least one platinum group metal.

18. The coating system according to claim 12, wherein the overlay coating contains silicon.

19. The coating system according to claim 12, further comprising a thermal-insulating ceramic layer adhered to the overlay coating.

20. The coating system according to claim 12, wherein the overlay coating does not contain any platinum group metal.

* * * * *